Patented Aug. 18, 1953

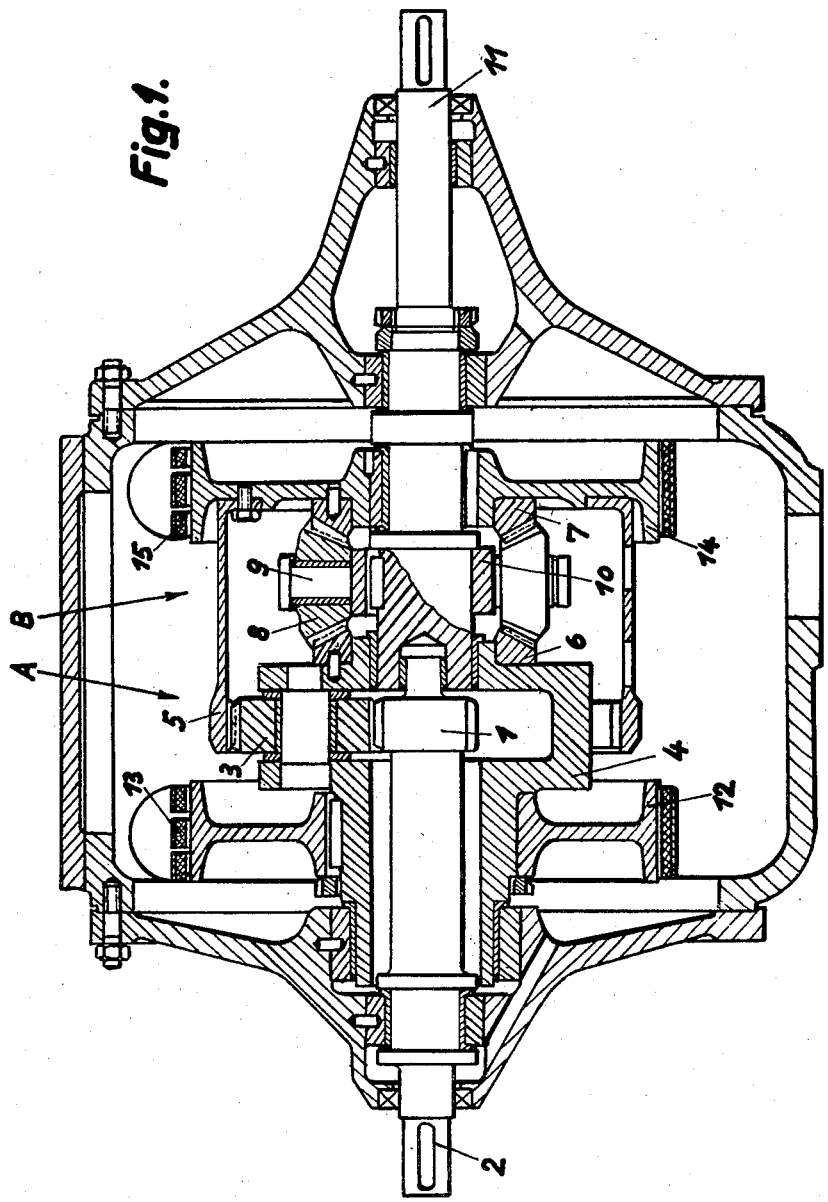

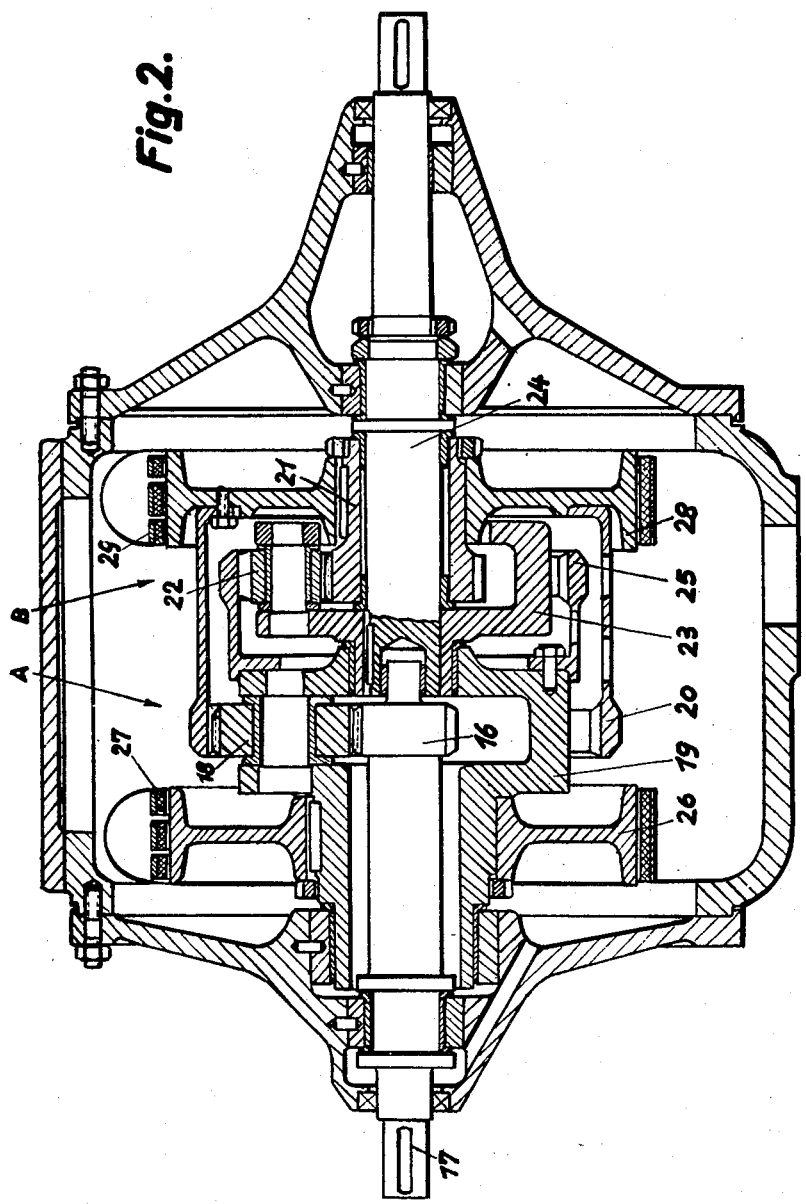

2,648,998

UNITED STATES PATENT OFFICE 2,648,998

PLANETARY SPEED-REDUCING AND REVERSING GEAR

Wilhelm G. Stoeckicht, Munich-Solln, Germany

Application May 1, 1950, Serial No. 159,359
In Germany May 6, 1949

5 Claims. (Cl. 74—758)

This invention relates to epicyclic speed-reducing and reversing gear. Such gears are already known with two sets of sun and planet wheels, with the help of which a variable speed-reduction and reversing gear is provided. They consist in general of one set of sun and planet wheels which acts as a speed-reduction gear for forward travel, and a second set of sun and planet wheels which acts as a speed-reduction gear for running in reverse. In each case one of these two sets of wheels is revolving idly, that is, without transmitting power.

The following explanations are based on the fact that any epicyclic gear, irrespectively of how it may be designed in other respects, consists of three members, namely: one central wheel (sun wheel or annulus) as the first member, another central wheel (sun wheel or annulus) as the second member, and the carrier of the epicyclic or planet pinions, upon which the said pinions meshing with the two central wheels are rotatably mounted, as the third member.

According to this invention a speed-reducing and reversing gear is provided consisting of two sets of epicyclic gears, which may be arranged, in series, two of the three members of one set always being severally united to two of the members of the other set to form two units, one of these units being rotatable while the other is stationary, and one of the units including a single planet-carrier, while of the two remaining members of the two sets one is connected with the driving shaft and the other with the driven shaft. In this way a very compact speed-reducing and reversing gear is provided, which not only reverses the direction of revolution but also reduces (or increases) the speed with a very high velocity ratio.

According to a further feature of the invention both the units are rotatably arranged, and they are each provided with a disengageable holding device or braking device by which they can be held fast alternatively. In this way a variable-speed and reversing gear with striking properties is provided. Whereas in the gears of this nature hitherto known one set of sun and planet wheels revolves idly, and therefore merely causes losses, with the present invention all parts of the gear participate in the transmission of power in both directions of travel, that is, not only when travelling forwards but also in reverse, so that in this way the wasteful dragging round of gear parts not participating in the transmission of power is avoided.

An advantageous form of construction of the invention is obtained by coupling the planet-carrier of one set with one central wheel of the other set, and coupling one central wheel of the first set with the second central wheel of the second set, while the second central wheel of the first set is connected with one gear shaft, for instance with the driving shaft, and the planet-carrier of the second set is connected with the other gear shaft, for instance the driven shaft.

Two embodiments of the invention are illustrated by way of example in the accompanying drawings, in which:

Figure 1 shows in longitudinal section a gear unit wherein one set of sun and planet wheels is constructed as a spur-wheel epicyclic gear and the other set as a bevel-wheel epicyclic gear; and Figure 2 shows in longitudinal section another form of construction, in which both sets of sun and planet wheels, which are arranged in series, are constructed as spur-wheel epicyclic gears.

The gear illustrated in Figure 1 consists of a spur-wheel epicyclic gear A, which is connected according to the teaching of the invention with a bevel-wheel epicyclic gear B. The spur-wheel epicyclic gear A consists of an inner central wheel or sun wheel 1, which is mounted fast upon the driving shaft 2, and is in mesh with planet pinions 3, which in their turn are rotatably mounted in a planet-carrier 4. The epicyclic pinions 3 are also in mesh with an outer central wheel or drum 5. For the sake of clearness the drawing shows only one of the epicyclic pinions 3, the number of such pinions being immaterial to the method of operation of the invention.

The second set B of sun and planet wheels, which in the present constructional example is represented as a bevel-wheel epicyclic gear, consists of two central bevel wheels 6 and 7, which in the present example are of the same size, and which are in mesh with epicyclic bevel pinions 8, which in their turn are mounted upon pins 9 in a planet-carrier 10, which in its turn is connected fast with the driven shaft 11. For the sake of clearness two epicyclic pinions 8 are shown here, but the number of such pinions is immaterial for the operation of the invention.

The planet-carrier 4 of the epicyclic set A is coupled to or connected fast with one central wheel 6 of the epicyclic set B, while the outer central wheel 5 of the epicyclic set A is coupled to or connected fast with the second central wheel 7 of the epicyclic set B. Furthermore the planet-carrier 4 of the set A, and with it the central wheel 6 of the set B, are connected fast with a brake disc 12, which can be held fast by means of a braking appliance 13. Similarly the outer central wheel 5 of the set A, and with it the central wheel 7 of the set B, are connected fast with a further brake disc 14, which can be held fast by means of a braking appliance 15.

The method of operation of this constructional form of the invention will now be described: when power is supplied to the gear by way of the driving shaft 2, and the brake disc 14 is held fast by means of the brake 15, the outer central wheel 5 of the set A and the central wheel 7 of the set B both remain stationary. In the set A the epicyclic pinions 3 are set in rotation in a known manner by the driving central wheel 1. In rolling around the stationary outer central wheel 5 they rotate the planet-carrier 4 in the same direction as the sun wheel 1, but at a reduced speed. Under these circumstances the planet-carrier 4 of the set A carries round with it the central wheel 6 of the set B, which is coupled to it. This central wheel 6 sets in rotation in a known manner the epicyclic pinions 8 of the set B, and these, in rolling around the stationary central wheel 7, take round with them in the same direction with a reduced speed the planet-carrier 10, and with it also the driven shaft 11, which is connected fast with the planet-carrier 10. In the gear as a whole, therefore, there is a double reduction of speed, with an unchanged direction of revolution.

If the brake 15 is now released, and the brake disc 12 is held fast instead by means of the brake 13, the planet-carrier 4 of the set A, and the central wheel 6 of the set B, are held fast with it, whereas now the outer central wheel 7, which is occupied thereto, of the set B. If power is now supplied by way of the driving shaft 2 and the central wheel 1 of the set A, the central wheel 1 sets the epicyclic pinions 3 in rotation, in which case, in a known manner, since the planet-carrier 4 is stationary, the outer central wheel 5 is set in rotation with reversal of the direction of rotation and at the same time with a reduction in speed. The outer central wheel 5 of the set A takes with it the central wheel 7, coupled thereto, of the set B, which in its turn sets in rotation the epicyclic pinions 8, which roll around the now stationary central wheel 6, taking with them the planet-carrier 10 in the direction of rotation of the central wheel 7 but at a reduced speed. The planet-carrier 10 takes with it in its turn the driven shaft 11, which is non-rotatably connected therewith. In this condition of operation, therefore, in the gear as a whole, a reduction in speed is now effected, together with a reversal of the direction of rotation.

In Figure 2 another constructional example is illustrated, which is distinguished from the embodiment shown in Figure 1 by the fact that both the sets of sun and planet wheels A and B are represented as spur-wheel epicyclic gears.

The spur-wheel epicyclic gear A consists as in the first example of an inner central wheel or sun wheel 16, which is secured fast to the driving shaft 17, and is in mesh with epicyclic pinions 18, which in their turn are rotatably mounted in a planet-carrier 19. The epicyclic pinions 18 are furthermore in mesh with an outer central wheel or drum 20. Here again, for the sake of greater clearness, only one of the epicyclic pinions is shown, in section. The second epicyclic set B has an inner central wheel or sun wheel 21, which is in mesh with epicyclic pinions 22, which are rotatably mounted in a planet-carrier 23, which in its turn is connected fast with the driven shaft 24. Here again only one of the epicyclic pinions is shown, in section. The epicyclic pinions 22 are also in mesh with an outer central wheel 25 of the set B.

The planet-carrier 19 of the set A is connected fast with or coupled to the outer central wheel 25 of the set B, and the outer central wheel 20 of the set A is coupled to or connected fast with the inner central wheel 21 of the set B.

Furthermore the planet-carrier 19 of the set A, and with it the outer central wheel 25 of the set B, are connected fast with a brake disc 26, which can be held fast by means of braking appliance 27. Similarly the inner central wheel 21 of the set B, and with it the outer central wheel 20 of the set A, are connected fast with a brake disc 28, which can be held fast by means of a braking appliance 29.

The method of operation of the invention in the example represented in Figure 2 is the same as in the example of Figure 1.

If power is supplied to the gear by way of the driving shaft 17, and the brake disc 28 is held fast by means of the brake 29, the planet-carrier 19, as in the first example, is rotated in the same direction as the driving shaft 17 but with a reduced speed. At the same time the planet-carrier 19 takes with it the outer central wheel 25, coupled thereto, of the set B. Since the inner central wheel 21 of the set B is stationary, as it is held fast by the braking means 28, 29, the planet-carrier 23 of the set B is in a known manner driven in the same direction but with a further reduced speed, taking with it also the driven shaft 24 of the gear, which is coupled fast to the planet-carrier 23. In the gear as a whole, therefore, a reduction of speed is now effected without reversal of the direction of rotation.

If on the other hand the brake 29 is released, and the brake disc 26 is held fast instead by means of the brake 27, the planet-carrier 19 of the set A and the outer central wheel 25 of the set B are thereby held fast. If power is now supplied by way of the driving shaft 17, a rotation at a reduced speed in the opposite direction is imparted to the outer central wheel 20 of the set A. The inner central wheel 21 of the set B, which is coupled with the outer central wheel 20 of the set A, is driven in the same direction. Since the outer central wheel 25 of the set B is stationary, the planet-carrier 23 of the set B is rotated in the same direction but at a reduced speed, taking with it at the same time the driven shaft 24 of the gear, which is connected fast with the planet-carrier 23. There is thus effected in the gear a reduction in speed of revolution with a reversal in direction of rotation.

Instead of the brake shown there may of course alternatively be employed other holding appliances, such as disengageable dog clutches or the like.

By appropriately selecting the transmission ratios in the sets of sun and planet wheels A and B it is possible to make the transmission ratios of the gear as a whole, for the forward speed and the reverse speed of the gear, either equal to one another or different. The latter choice presents special advantages, particularly, for example, for ships' and other reversing gears, in which it is advantageous to provide a higher ratio of reduction for travelling astern than for travelling ahead.

In the constructional examples described above, the operation of the gear for the case of a reversing and speed-reducing gear is described. If it be desired to employ the gear as a reversing gear with multiplication of speed, the driving is effected by way of what has been described above as the driven shaft, and the drive is taken from what has been called the driving shaft. The essence of the invention is not in any way affected thereby.

The invention yields the great advantage that by its teaching it is possible to build a reversing gear which contains no more power-transmitting parts than would be necessary in a two-stage gear for the reduction in speed in itself and in which idle-running gear parts are obviated. It presents quite special advantages where, besides the function as a reversing gear, high ratios of reduction in speed are at the same time required, as is the case more particularly in drives connected with steam or gas turbines, the speeds of revolution of which are in general very high.

Having now particularly described and ascertained the nature of my said invention and in what manner the same is to be performed, I declare that what I claim is:

1. A speed change and reversing epicyclic gear comprising in combination, a casing structure, a driving shaft and a driven shaft mounted coaxially in said casing, first and second epicyclic gear trains within said casing structure and connecting said driving and driven shaft, the first gear train comprising a sun gear mounted on the driving shaft for unitary rotation therewith, a planet carrier and a ring gear mounted to rotate coaxially with the driving shaft, and at least one planet gear rotatably mounted on said carrier and meshing with said sun gear and ring gear, the second gear train comprising a planet carrier mounted on the driven shaft for unitary rotation therewith, at least one planet gear rotatably mounted on said second planet carrier, and a sun gear and a ring gear both mounted to rotate coaxially with the driven shaft, and both meshing with said second planet gear, means connecting the ring gear of the first train for unitary rotation with the sun gear of the second train and comprising a brake drum, means connecting the carrier of the first train for unitary rotation with the ring gear of the second train, and two braking means within said casing for selectively braking the carrier (or the ring gear of the first train), the braking means for braking the said ring gear including said brake drum.

2. A speed change and reversing epicyclic gear comprising in combination, a driving shaft and a coaxial driven shaft, first and second epicyclic gear trains drivingly connecting said driving and driven shafts, the first gear train including a sun gear connected to the driving shaft for unitary rotation therewith, a planet carrier and a ring gear arranged to rotate coaxially with the driving shaft, and at least one planet gear rotatably mounted on said carrier and meshing with said sun and ring gear, the second gear train including a planet carrier mounted for unitary rotation with the driven shaft, at least one planet gear rotatably mounted on said second planet carrier, and a sun gear and a ring gear both arranged to rotate coaxially with the driven shaft and both meshing with said second planet gear, means connecting the carrier of the first train for unitary rotation with the ring gear of the second train, means connecting the ring gear of the first train for unitary rotation with the sun gear of the second train, and braking means for selectively braking the carrier or the ring gear of the first train.

3. A speed change and reversing epicyclic gear comprising in combination, a casing, a driving and a driven shaft mounted coaxially in said casing, first and second epicyclic gear trains drivingly connecting said driving and driven shafts, the first gear train including a sun gear connected to the driving shaft for unitary rotation therewith, a planet carrier and a ring gear arranged to rotate coaxially with the driving shaft, and at least one planet gear rotatably mounted on said carrier and meshing with said sun and ring gear, the second gear train including a planet carrier mounted for unitary rotation with the driven shaft, at least one planet gear rotatably mounted on said second planet carrier, and a sun gear and a ring gear both arranged to rotate coaxially with the driven shaft and both meshing with said second planet gear, means connecting the carrier of the first train for unitary rotation with the ring gear of the second train, means connecting the ring gear of the first train for unitary rotation with the sun gear of the second train, and braking means for selectively braking the carrier or the ring gear of the first train.

4. A speed change and reversing epicyclic gear as claimed in claim 2, said means for connecting the ring gear of the first gear train with the sun gear of the second gear train encompassing the carrier and the ring gear of the second gear train.

5. A change speed and reversing planetary gear comprising in combination, hollow casing structure, a driving shaft and a driven shaft mounted coaxially in said casing, first and second gear trains and separate brake means for said gear trains all enclosed in said casing, said first gear train comprising a sun gear mounted on the driving shaft for unitary rotation therewith, a planet carrier with at least one planet gear rotatably mounted thereon and in mesh with said sun gear and a ring gear in mesh with said planet gear, a first brake disc carried by said planet carrier, said second gear train comprising a sun gear, a planet carrier mounted on the driven shaft for unitary rotation therewith, and having at least one planet gear rotatably mounted on said planet carrier and in mesh with said sun gear for the second gear train, a ring gear in mesh with said planet gear, a second brake disc carried by the sun gear of the said second gear train, means connecting the ring gear of the first gear train with the said second brake disc and means connecting the ring gear of the second gear train with the planet carrier of said first gear train.

WILHELM G. STOECKICHT.

References Cited in the file of this patent

UNITED STATES PATENTS

| Number | Name | Date |
|---|---|---|
| 1,333,952 | Ward | Mar. 16, 1920 |
| 1,379,833 | Newton | May 31, 1921 |
| 1,721,123 | Kemper | July 16, 1929 |

FOREIGN PATENTS

| Number | Country | Date |
|---|---|---|
| 414,898 | Great Britain | Aug. 16, 1934 |